(12) United States Patent
Holma et al.

(10) Patent No.: US 6,446,894 B1
(45) Date of Patent: Sep. 10, 2002

(54) PLANETARY GEAR ASSEMBLY FOR FISHING REEL

(75) Inventors: Thomas Holma, Svängsta; Börje Moosberg, Mörrum, both of (SE); Robert Sandman, Spirit Lake, IA (US)

(73) Assignee: Pure Fishing, Inc., Spirit Lake, IA (US)

( * ) Notice: Subject to any disclaimer, the term of this patent is extended or adjusted under 35 U.S.C. 154(b) by 0 days.

(21) Appl. No.: 09/569,028

(22) Filed: May 11, 2000

(51) Int. Cl.[7] ................................................ A01K 89/00
(52) U.S. Cl. ...................................... 242/249; 242/255
(58) Field of Search ................................ 242/249, 255, 242/264

(56) References Cited

U.S. PATENT DOCUMENTS

| | | | | |
|---|---|---|---|---|
| 463,377 | A | * 11/1891 | Atkinson | 242/255 |
| 2,335,752 | A | * 11/1943 | Geiger | 242/255 |
| 2,918,227 | A | 12/1959 | Mauborgne | 242/255 |
| 3,116,892 | A | * 1/1964 | Pickard | 242/255 |
| 3,215,360 | A | * 11/1965 | Chambers | 242/255 |
| 4,232,842 | A | 11/1980 | Noda | 242/212 |
| 4,564,158 | A | 1/1986 | Moosberg et al. | 242/220 |
| 4,566,655 | A | 1/1986 | Young | 242/215 |
| 4,572,454 | A | 2/1986 | Furomoto | 242/84.52 B |
| 4,593,866 | A | 6/1986 | Moosberg et al. | 242/84.52 B |
| 4,601,439 | A | 7/1986 | Moosberg | 242/84.52 B |
| 4,815,676 | A | 3/1989 | Young | 242/219 |
| 4,871,129 | A | * 10/1989 | Hashimoto | 242/255 |
| 4,927,095 | A | 5/1990 | Young | 242/261 |
| 5,090,634 | A | * 2/1992 | Kaneko | 242/255 |
| 5,340,053 | A | * 8/1994 | Morimoto | 242/261 |
| 5,560,562 | A | 10/1996 | Hartmann | 242/255 |

FOREIGN PATENT DOCUMENTS

| | | |
|---|---|---|
| JP | 650968 | 7/1994 |
| JP | 650969 | 7/1994 |
| JP | 650970 | 7/1994 |
| JP | 2839104 | 10/1998 |

* cited by examiner

*Primary Examiner*—Emmanuel M. Marcelo
(74) *Attorney, Agent, or Firm*—Roylance, Abrams, Berdo & Goodman, L.L.P.

(57) ABSTRACT

A fishing reel includes a planetary gear drive assembly where the spool rotates on a fixed shaft. A handle crank is coupled to a ring gear for driving planet gears and a pinion. The pinion rotates on the shaft and slides axially on the shaft to engage and disengage the planetary gear assembly to the spool. A carrier supporting the planet gears is coupled to a drag assembly for limiting rotation of the carrier.

33 Claims, 5 Drawing Sheets

PLANETARY GEAR ASSEMBLY FOR FISHING REEL

FIELD OF THE INVENTION

The present invention is directed to a fishing reel having a planetary drive assembly. More particularly, the invention is directed to a planetary gear drive assembly for a fishing reel having a rotating spool that rotates on a fixed shaft.

BACKGROUND OF THE INVENTION

A common type of fishing reel has an open spool mounted on a rotating shaft for winding and casting the fishing line. These fishing reels typically have a hand crank and gear system that is offset from the axis of the spool. The offset gear assemblies have a series of gears that rotate in an opposite direction to the direction of rotation of the crank.

Conventional crank assemblies usually contact a single drive gear in a location that is off center from the axis of rotation of the spool. This arrangement produces a poorly balanced force applied to the drive gear and creates a force that pushes the gears apart. In addition, the axis of rotation of the crank handle is off center from the axis of rotation of the spool further contributing to a poorly balanced cranking force.

Various fishing reels have been proposed in an attempt to overcome the disadvantages of these prior fishing reels. One such fishing reel is disclosed in U.S. Pat. No. 4,927,095 to Young. This patent discloses a fishing reel having a planetary gear drive for driving a spool. In this device, a crank is connected to a ring gear for driving a pinion gear. The spool is fixed to a spool shaft that rotates in a housing. The pinion gear includes a key to engage the spool shaft. A cam member moves the pinion axially on an extension of the spool shaft. Planetary gears that are mounted on a carrier engage the ring gear and the pinion gear for driving the pinion gear. The pinion slides on the spool shaft extension to engage and disengage the pinion from the shaft.

Another planetary gear drive system for a fishing reel is disclosed in U.S. Pat. No. 5,560,562 to Hartmann. This device includes a three speed planetary gear drive. A crank handle is coupled to the carrier for the planetary gears and the ring gear is fixed to the housing. The sun or pinion gear is driven by the planet gears. The sun gear is coupled to the spool shaft and rotates the spool about its axis. A spool is rotatably mounted on the spool shaft and operatively connected to the spool shaft by an adjustable casting brake for driving the spool.

These devices are reasonably effective in achieving the desired purpose. However, a continuing need exists in the industry for a fishing reel having improved drive systems.

SUMMARY OF THE INVENTION

The present invention is directed to a fishing reel having a planetary gear drive assembly. More particularly, the invention is directed to an improved planetary drive assembly for a fishing reel where a spool is driven by a pinion gear of the drive assembly.

Accordingly, a primary object of the invention is to provide a fishing reel drive assembly having a planetary gear assembly with a crank handle coupled to a ring gear for driving a pinion gear.

A further object of the invention is to provide a planetary gear assembly for a fishing reel having a pinion drive gear rotatably mounted on a fixed shaft.

Another object of the invention is to provide a planetary gear drive assembly for a fishing reel having a spool rotatably mounted on a fixed shaft.

A further object of the invention is to provide a planetary gear drive assembly for a fishing reel having a fixed shaft with a rotatable spool and pinion drive gear mounted on the shaft.

Still another object of the invention is to provide a planetary gear assembly for a fishing reel having a spool and pinion drive gear rotatably mounted on a common fixed shaft where the pinion is slidable on the shaft into and out of driving engagement with the spool.

Another object of the invention is to provide a fishing reel having a rotatable cam for camming the pinion gear into and out of driving engagement with the spool.

The objects and advantages of the invention are basically attained by providing a fishing reel comprising a frame and a spool shaft coupled to the frame which is non-rotatable with respect to the frame. A spool is rotatably mounted on the spool shaft for receiving a fishing line. A handle crank is rotatably coupled to the frame in axial alignment with the spool shaft. A ring gear is coupled to and driven by the handle cranks. The ring gear has internal teeth. A planetary gear carrier and a plurality of planetary gears are rotatably mounted on the carrier and engage the internal teeth of the ring gear. A drag control assembly resists rotation of the carrier with respect to the frame. A pinion gear having external teeth engages the planetary gears and are rotatably mounted on the spool shaft and are removably coupled with the spool.

The objects of the invention are also attained by providing a fishing reel comprising a housing and a non-rotating spool shaft fixed to the housing. A spool is rotatably mounted on the spool shaft for receiving a fishing line. A handle crank is rotatably coupled to the housing in axial alignment with the spool shaft. A ring gear is coupled to and is driven by the handle crank. The ring gear has internal teeth. A planetary gear carrier is mounted in the housing. A plurality of planetary gears are rotatably mounted on the carrier and engage the internal teeth on the ring gear. A drag control assembly is coupled to the housing for selectively resisting rotation of the carrier with respect to the housing. A pinion gear is mounted on the spool shaft. The pinion gear is rotatable and axially slidable on the spool shaft, and a biasing assembly axially slides the pinion on the spool shaft into driving engagement with the spool.

These and other objects, advantages and salient features of the invention will become apparent to one skilled in the art in view of the following detailed description, which taken in conjunction with the annexed drawings, disclose a preferred embodiment of the invention.

BRIEF DESCRIPTION OF THE DRAWINGS

Referring to the drawings which form a part of this original disclosure, in which.

DETAILED DESCRIPTION OF THE INVENTION

The present invention is directed to a fishing reel having a planetary gear drive assembly. More particularly, the invention is directed to a fishing reel having a planetary gear assembly where the ring gear is driven by the crank handle.

Referring to the drawings, the fishing reel 10 in one preferred embodiment of the invention includes a frame 12, a planetary gear assembly 14, a housing 16 and a level wind screw assembly 18.

Figure 1:
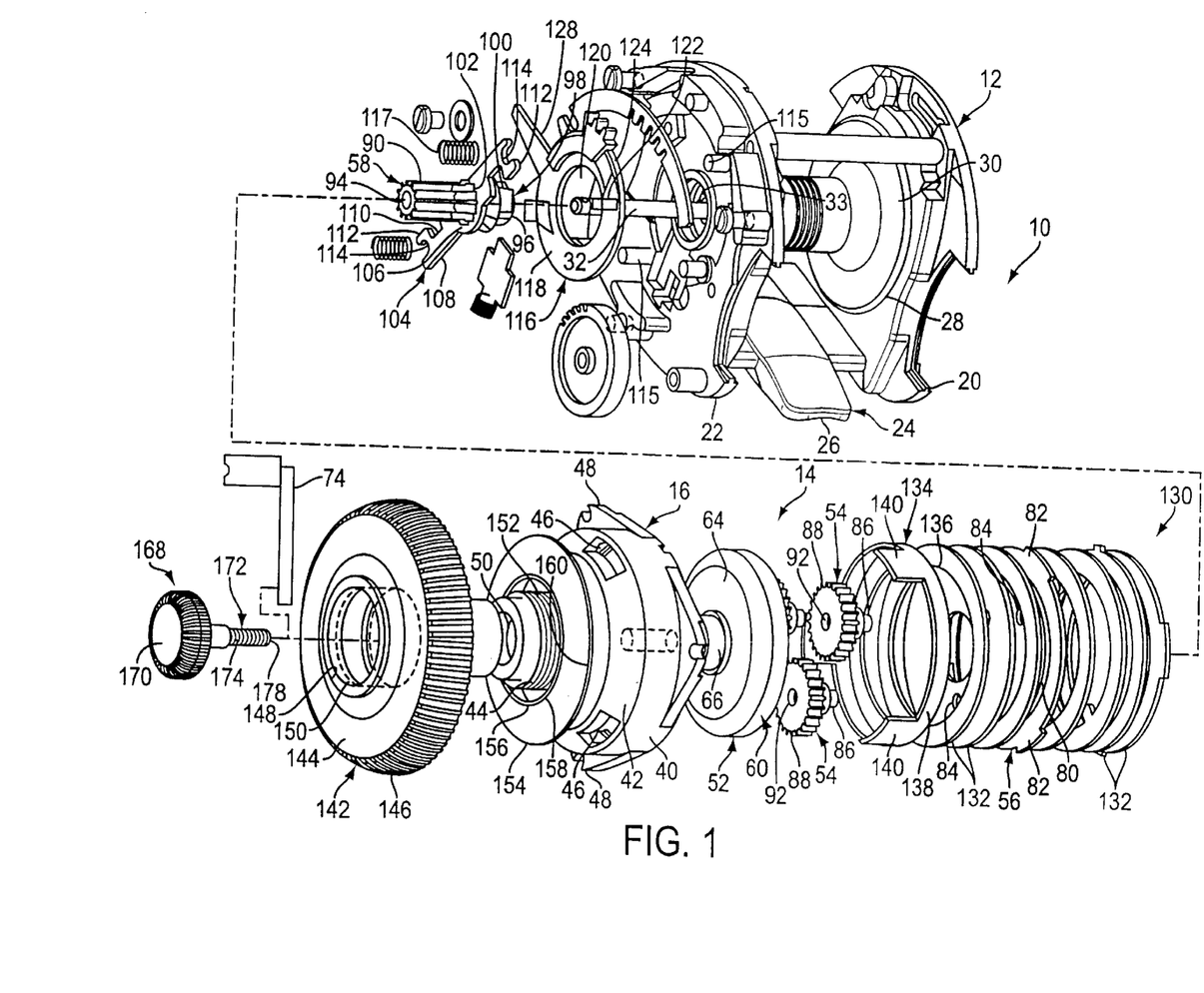
FIG. 1 is an exploded view of the fishing reel in a preferred embodiment of the invention.

The frame 12, as shown in FIG. 1, includes side walls 20 and 22 connected together by a base 24. Base 24 includes a curved portion 26 for coupling with a fishing rod as known in the art.

Figure 1A:
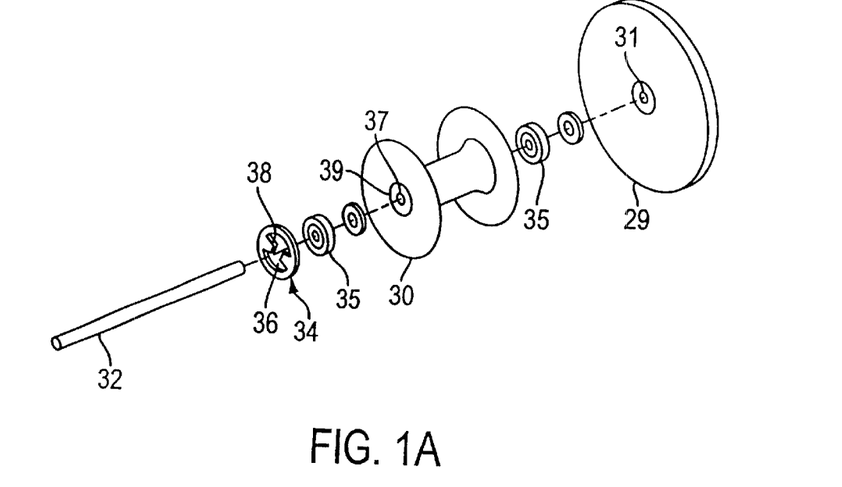
FIG. 1A is an exploded view of the spool and cover for the housing of the fishing reel of FIG. 1.

As shown in FIG. 1, side wall 20 is provided with an opening 28 dimensioned to receive a spool 30. Referring to FIG. 1A, an outer cover 29 is coupled to side wall 20 by screws or other suitable fasteners. Cover 29 is dimensioned to enclose opening 28 in side wall 20. A centrally located recess 31 is provided on an inner surface of cover 29 for receiving one end of a shaft 32. Preferably, shaft 32 is coaxially aligned with opening 28 and coupled to recess 31 in cover 29. Shaft 32 can be press fitted into recess 31 and is preferably fixed to cover 29 to prevent rotation of shaft 32 with respect to cover 29 and frame 12.

Side wall 22 has a central opening 33 coaxially aligned with recess 31 in cover 29. As shown in FIG. 1, opening 33 in side wall 22 is dimensioned to enable shaft 32 to pass through. Shaft 32 has a first end coupled to cover 29 and has a length to extend through frame 12 and into housing 16. As discussed hereinafter in greater detail, planetary gear assembly 14 surrounds and is supported by shaft 32. A second end of shaft 32 is supported by housing 16.

Spool 30 is rotatably mounted on shaft 32 between side walls 20 and 22. Side wall 22 and cover 29 limit axial movement of spool 30 on shaft 32 and within frame 12. Spool 30 includes a central portion and radial flanges at each axial end as in conventional spools. An axial passage 37 extends through spool 30 and a recess 39 is formed in each axial end for receiving a bearing 35. The bearings 35 include a standard sealed bearing housing having bearings supported between an inner race and an outer race. A plurality of ball bearings are received in an annular groove in the inner and outer race enabling the outer race to rotate with respect to the inner race. In preferred embodiments, the inner race is press fitted onto shaft 32 and the outer race is press fitted into the axial recesses 39 in spool 30.

As shown in FIG. 1A, spool 30 includes a locking ring 34 attached the axial face of spool 30 that faces side wall 22 for engaging drive assembly 14. In one embodiment, locking ring 34 is press fitted into a recess in the axial face of spool 30. Locking ring 34 includes a central opening 36 and locking tabs 38 extending radially inward from the ring 34 into opening 36. In the embodiment illustrated, locking tabs 38 extend inwardly from opposite sides of locking ring 34. Locking ring 34 is mounted on the axial face of spool 30 so that locking tabs 38 are accessible through opening 33 in side wall 20. In further embodiments, the actual number of locking tabs provided on locking ring 34 can vary depending on the needs of the assembly.

Housing 16 has a generally cylindrical shaped side wall 40, a frustoconical shaped end wall 42 and an annular collar 44. A plurality of openings 46 are provided in the frustoconical end wall 42. In one embodiment, three openings 46 are symmetrically spaced on end wall 42 and positioned adjacent side wall 40. In the embodiment illustrated, three coupling tabs 48 extend outwardly from side wall 40. Each coupling tab 48 includes a recess for receiving a screw for coupling housing 16 to side wall 22 of frame 12. Collar 44 has a generally cylindrical shape with an axial opening 50.

Axial opening 50 is positioned so that when housing 16 is coupled to frame 12, axial opening 50 is coaxially disposed with shaft 32 and opening 33 in side wall 22 of frame 12.

Figure 2:
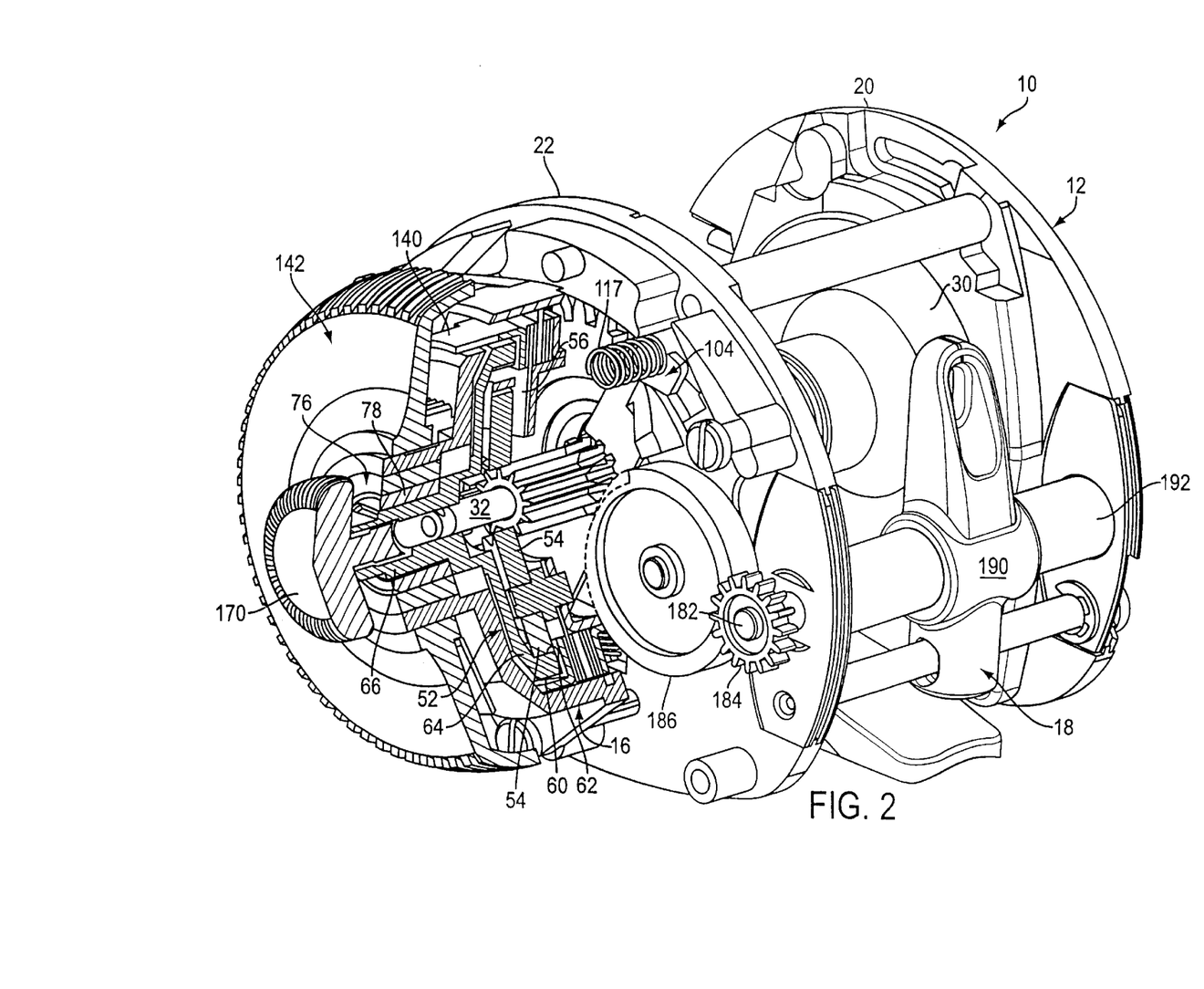
FIG. 2 is a perspective view in partial cross-section of the fishing reel of FIG. 1 showing the planetary gear assembly.
Figure 3:
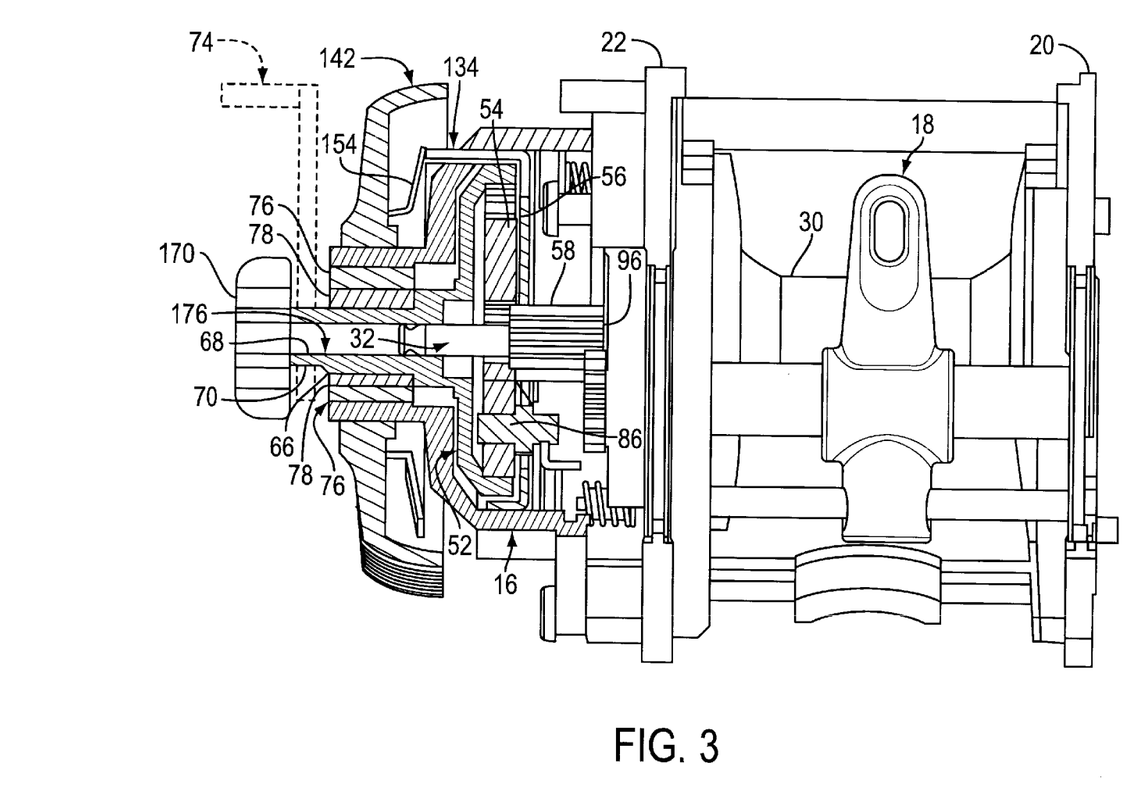
FIG. 3 is a front view in partial cross section of the fishing reel of FIG. 1.
Figure 4:
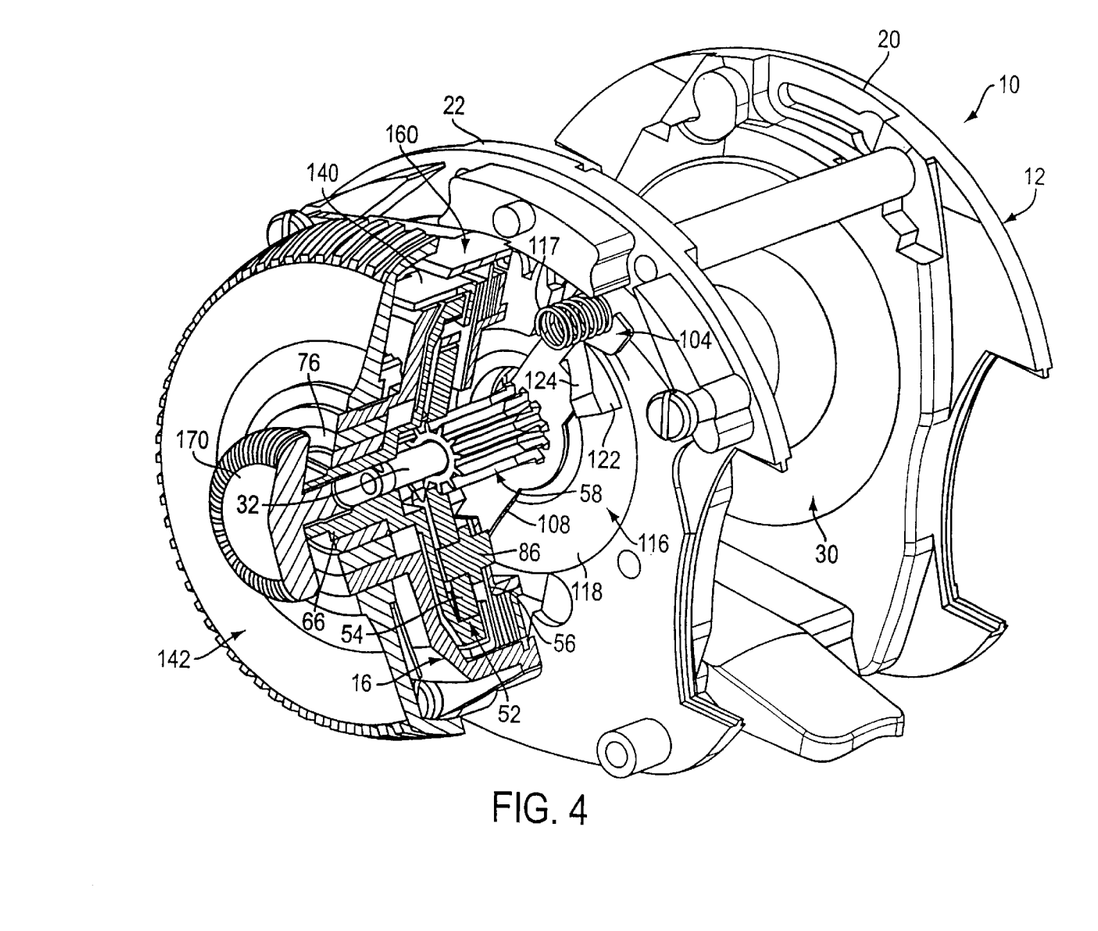
FIG. 4 is a perspective view in partial cross section of the fishing reel of FIG. 1 showing the camming mechanism.

Referring to FIGS. 2 and 3, planetary gear assembly 14 includes a ring gear 52, planet gears 54, a planet gear carrier 56, and a pinion gear 58. Ring gear 52 includes a cylindrical side wall 60 having internal teeth 62. Side wall 60 is integrally formed with an end wall 64 extending inwardly from side wall 60 toward a central axis of ring gear 52. An annular collar 66 extends coaxially with side wall 60 in an opposite direction from side wall 60. Annular collar 66 has a diameter less than an inner diameter of collar 44 of housing 16 to enable collar 66 to be coaxially aligned with housing 16.

Annular collar 66 of ring gear 52 includes an axial passage 68 dimensioned to receive shaft 32. Annular collar 66 includes an outer end 70 having a flat notch 72 for coupling with a handle crank 74. As shown in FIG. 2, annular collar 66 of ring gear 52 extends through axial opening 50 of housing 16 and is coaxial with housing 16 and shaft 32.

Referring to FIG. 2, ring gear 52 is rotatably mounted on shaft 32 within housing 16. Annular collar 66 of ring gear 52 is mounted directly on shaft 32 for rotation thereon.

An antireverse assembly 76 is press fitted in the opening 50 of collar 44 of housing 16. Antireverse assembly 76 is coupled to housing 16 and collar 66 of ring gear 52 to allow ring gear to rotate in only one direction with respect to housing 16. An annular bushing or bearing 78 is then press fitted into antireverse assembly 76. Annular collar 66 of ring gear 52 extends through bearing 78 to allow rotation of ring gear 52 with respect to housing 16 and shaft 32. As shown in FIG. 2, annular collar 66 of ring gear 52 extends from annular collar 44 of housing 16 a distance to enable handle crank 74 to be coupled to annular collar 66.

Carrier 56 as shown in FIG. 1 is an annular plate having a central opening 80 and a plurality of outwardly extending tabs 82. In the embodiment illustrated, three tabs 82 are symmetrically spaced around carrier 56, although the actual number of tabs can vary. Carrier 56 includes a plurality of apertures 84 for receiving mounting pins 86. Each pin 86 is compression fitted into an aperture 84 and coupled to the carrier 56. Planet gears 54 include an axial passage for receiving a respective pin 86 for rotationally mounting planet gears 54 on carrier 56. As shown in FIG. 2, planet gears 54 include external teeth 88 for meshing with the internal teeth of ring gear 52.

Pinion 58 has a generally cylindrical shape with external teeth 90 and an axial bore 92. Pinion 58 is mounted on shaft 32 and is able to rotate and slide freely on shaft 32. As shown in FIG. 1, pinion 58 has a first end 94 facing the end wall of housing 16 and a second end 96 facing spool 30. Second end 96 of pinion 58 includes a sleeve 98 having an axial face with a notch 100. Notch 100 extends across the axial face of sleeve 98 and is dimensioned to mate with tabs 38 of ring 34 on spool 30. An annular groove 102 is formed in the outer surface of pinion 58 adjacent sleeve 98.

Referring to FIG. 1, an actuator arm 104 is coupled to pinion 58 for sliding pinion 58 axially on shaft 32. Actuator arm 104 includes a centrally located, generally U-shaped recess 106 that is dimensioned to receive annular groove 102 of pinion 58. U-shaped recess 106 is centrally located to define outwardly extending arms 108. Each arm 108 includes an opposing recess 110 on opposite sides. Each arm 108 has an outer edge 112 with a recess 114.

Side wall 20 includes two pins 115 extending in an axial direction toward housing 16 that are positioned on opposite sides of shaft 32. As shown in FIG. 2, recess 114 of each outer edge 112 is mounted on the pins 115 to prevent rotation of actuator arm 104 with respect to frame 12. The pins 115 allow limited movement of actuator arm 104 in an axial direction with respect to pinion 58. A coil spring 117 is provided on the pins 115 having a first end engaging an inner surface of housing 16 and a second end engaging actuator arm 104. The spring 117 biases actuator arm 104 toward frame 12 and biases pinion 58 into engagement with locking ring 34 on spool 30.

An actuating cam member 116 is provided in housing 16 and includes an annular body 118 having a central aperture 120 coaxial with shaft 32. Annular body 118 is positioned coaxially with shaft 32 and has an axial surface facing actuator arm 104. A cam member 122 having an inclined camming surface 124 is coupled to the axial face of annular body 118. A lever 128 extends radially outward from annular body 118 and through a slot in housing 16. Actuator cam 116 is mounted adjacent side wall 22 of frame 12 for rotation around shaft 32 by manual manipulation of lever 128. Rotation of cam member 116 pushes actuator arm 104 against the springs and disengages pinion 58 from spool 30. A reverse rotation of cam member 116 permits the springs to bias pinion 58 into engagement with spool 30.

As shown in FIG. 1, a drag brake assembly 130 is provided for controlling the drag to the spool 30. Drag brake assembly 130 includes a plurality of drag washers 132 on each side of carrier 56. A pressure plate 134 is positioned against the outermost drag washer 132 adjacent housing 16 as shown in FIG. 1. Pressure plate 134 includes an axial face 136 and a cylindrical outer wall 138. Tabs 140 extend outwardly in the axial direction from cylindrical outer wall 138. In the embodiment illustrated, three tabs 140 are spaced symmetrically around outer wall 138, although the actual number of tabs can vary depending on the needs of the device. As shown in FIG. 1, drag washers 132 have a generally annular configuration and are arranged about a common axis with the axis of shaft 32. Drag washers 132 have a diameter to fit within the assembly and provide a greater surface area, and thus, a greater breaking force than conventional drag assemblies. It has been found that the drag assembly of the invention is able to obtain a drag force of about 3.5 to about 7.0 Kg.

A drag adjusting knob 142 includes an outer face 144, a side wall 146 and an axial bore 148. Axial bore 148 includes internal threads 150. In the embodiment illustrated, collar 44 of housing 16 includes external threads 152 dimensioned for mating with internal threads 150 of drag knob 142. Drag knob 142 is screwed onto collar 44 and is axially adjustable on collar 44 by the mating threads. A pressure washer 154 is dimensioned to fit within drag knob 142. Pressure washer 154 has a generally frustoconical shape and a central opening 156 dimensioned to receive annular collar 44 of housing 16. Pressure washer 154 has a first inner end 158 abutting drag adjusting knob and a second outer end 160 abutting tabs 140 of pressure plate 134.

The reel is assembled with shaft 32 coupled to frame 12 and extending axially through the opening in side wall 22. Actuator cam member 116 is then positioned around shaft 32. Actuator arm 104 is coupled to pinion 58 by positioning recess 106 in groove 102. Pinion 58 is then fitted onto shaft 32 with actuator arm 104 adjacent actuator cam 116. Actuator arm 104 is then positioned on the pins 115 extending from side wall 20.

Ring gear 52, planetary gear carrier 56 of planetary gear assembly 14, and drag assembly 130 are assembled in housing 16. Pressure washer 154 is then positioned on collar 44 of housing 16 followed by drag knob 142 and crank handle 74. The resulting assembly is coupled to frame 12 with shaft 32 extending through the axial passage of ring gear 52. Tabs 140 of pressure plate 134 are positioned to extend through the openings in housing 16.

As shown in FIG. 2, planetary gear assembly 14 is mounted coaxially on shaft 32 with collar 66 of ring gear 52 mounted on shaft 32. Carrier 56 of planetary gear assembly 14 is coupled to pinion 58 and ring gear 52. Drag assembly 130 is assembled with tabs 140 of pressure plate 134 extending through openings 46 in housing 16. As shown in FIG. 3, pressure washer 154 engages tabs 140 of pressure plate and an internal surface of drag knob 142.

Figure 5:
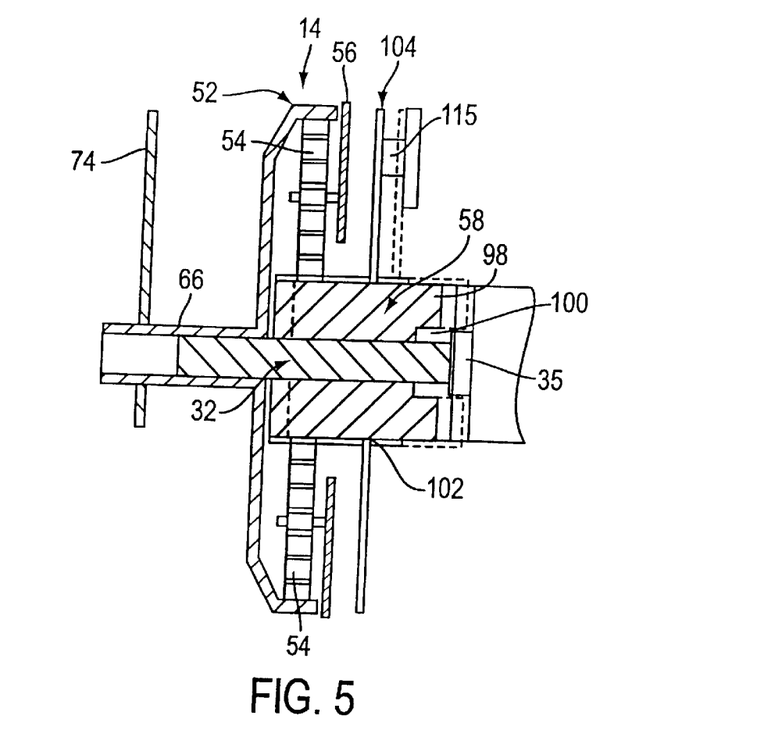
FIG. 5 is a partial cross-sectional view of the planetary gear assembly of the fishing reel of FIG. 1.

In use, drag knob 142 is tightened by rotating knob 142 on annular column 44 of housing 16 to push pressure washer 154 against tabs 140 of pressure plate 134. The force applied to pressure plate 134 applies a braking pressure to the tabs 82 of carrier 56 to prevent rotation of carrier 56 with respect to housing 16. Rotating the handle crank 74 rotates ring gear 52, which rotates planet gears 54 and pinion 58 with respect to housing 16 and shaft 32. The notch 72 in the axial end of pinion 58 engages locking ring 34 of spool 30 to rotate the spool 30 on shaft 32. Actuator cam 116 can be rotated about shaft 32 causing cam member 122 to cam actuator arm 104 and pinion 58 away from spool 30 to disengage planetary gear assembly 14 from spool 30. As shown in FIG. 5, cam member 122 pushes actuator arm 104 and pinion 58 axially toward housing 16 to disengage pinion 58 from locking ring 34.

As shown in FIG. 1 and FIG. 3, a casting brake assembly 168 is provided to control rotation of spool 30 on shaft 32. Casting brake assembly 168 includes a knob 170 coupled to a threaded shaft 172 having external threads 174. Collar 66 of ring gear 52 includes complementing internal threads 176 for meshing with threads 174 on shaft 172. Shaft 172 includes an axial end 178 abutting an axial end of shaft 32. Knob 170 is rotated to thread shaft 172 toward shaft 132 and apply an axial force on shaft 32. The axial force on shaft 32 applies an axial force on the bearings 35 supporting spool 30 on shaft 32 to resist the rotation of spool 30 on shaft 32. In this manner, the amount of axial force applied to shaft 32 adjusts the braking effect on spool 32 since spool 32 is axially fixed between side wall 20 and cover 29.

Level wind screw 18 includes a driven shaft 182 having a gear 184 mounted thereon. A connecting idle gear 186 is mounted on a pinion 188 and is coupled to pinion 58 and gear 154 to drive line level screw 18. Shaft 182 of wind level screw 18 includes a spiral groove for moving guide member 190 along a shaft 192 to guide the fishing line as it is wound onto the spool as known in the art.

While a single embodiment of the invention has been chosen to illustrate the invention, it is apparent to one skilled in the art that various additions and modifications can be made to the fishing reel without departing from the scope of the invention as defined in the appended claims.

What is claimed is:

1. A fishing reel comprising
   a frame;
   a spool shaft coupled to said frame and being non-rotatable with respect to said frame;
   a spool rotatably mounted on said spool shaft for receiving a fishing line;
   a handle crank rotatably coupled to said frame in axial alignment with said spool shaft,
   a ring gear coupled to and driven by said handle crank, said ring gear having internal teeth;

a planetary gear carrier and a plurality of planetary gears rotatably mounted on said carrier and engaging said internal teeth of said ring gear;

a drag control assembly for resisting rotation of said carrier with respect to said frame, said drag control assembly including a plurality of annular shaped washers oriented coaxially with said spool shaft; and a pinion gear having external teeth engaging said planetary gears and being rotatably mounted on said spool shaft and being disengagably coupled with said spool.

2. The fishing reel of claim 1, wherein said spool shaft has a first end fixed to said frame.

3. The fishing reel of claim 1, wherein said pinion gear has an axial face with a coupling member and wherein said spool includes a complementing coupling member for disengagably coupling with said coupling member of said pinion gear.

4. The fishing reel of claim 3, wherein said coupling member on said pinion gear is a notch in said axial face, and wherein said coupling member on said spool is a complementing tab on an axial face of said spool.

5. The fishing reel of claim 1, further comprising an actuating assembly for selectively sliding said pinion gear on said shaft into and out of coupling engagement with said spool.

6. The fishing reel of claim 5, wherein said actuating assembly biases said pinion gear into engagement with said spool.

7. The fishing reel of claim 6, wherein said actuating assembly includes an arm coupled to said pinion gear, said arm being biased toward said spool.

8. The fishing reel of claim 7, wherein said pinion gear includes a radial groove and said arm includes a recess for receiving said groove, wherein said arm is movable axially with respect to said shaft for axially moving said pinion gear on said shaft.

9. The fishing reel of claim 8, further comprising at least one spring for biasing said arm and pinion gear toward said spool.

10. The fishing reel of claim 8, further comprising a movable cam member engaging said arm for camming said arm away from said spool and disengaging said pinion gear from said spool.

11. The fishing reel of claim 10, wherein said cam member is rotatable about a common axis with said spool.

12. The fishing reel of claim 10, wherein said cam member includes a ring mounted for limited rotation about a common axis with said shaft, said ring having at least one inclined cam surface for camming said arm away from said spool.

13. The fishing reel of claim 1, comprising a bearing member on said shaft and rotationally supporting said spool, said reel further comprising a casting brake assembly for applying an axial pressure to said shaft with respect to bearing member of said spool for limiting free spinning of said spool on said shaft.

14. The fishing reel of claim 1, wherein said plurality of annular shaped washers of said drag control assembly are oriented for applying a braking pressure against opposing sides of said carrier, and said drag control assembly comprising an adjusting device for selectively adjusting the pressure of said annual shaped washers against said carrier.

15. A fishing reel comprising:

a housing;

a non-rotating spool shaft fixed to said housing;

a spool rotatably mounted on said spool shaft for receiving a fishing line;

a handle crank rotatably coupled to said housing in axial alignment with said spool shaft;

a ring gear coupled to and driven by said handle crank, said ring gear having internal teeth;

a planetary gear carrier mounted in said housing;

a plurality of planetary gears rotatably mounted on said carrier and engaging said internal teeth on said ring gear;

a drag control assembly coupled to said housing for selectively resisting rotation of said carrier with respect to said housing;

a pinion gear mounted on said spool shaft, said pinion gear being rotatable and axially slidable on said spool shaft; and a biasing assembly for axially sliding said pinion on said spool shaft into driving engagement with said spool.

16. The fishing reel of claim 15, wherein said pinion gear includes an axially facing engagement member and wherein said spool includes a complementing engagement member for engaging said engagement member on said pinion gear.

17. The fishing reel of claim 16, wherein said engagement member on said pinion gear is a notch in an axial face of said pinion gear, and wherein said engagement member in said spool is a tab on an axial face of said spool.

18. The fishing reel of claim 15, further comprising an engaging assembly for selectively sliding said pinion gear into and out of engagement with said spool.

19. The fishing reel of claim 15, wherein said engaging assembly biases said pinion gear into engagement with said spool.

20. The fishing reel of claim 19, wherein said engaging assembly includes an arm coupled to said pinion gear, said arm being biased toward said spool.

21. The fishing reel of claim 20, wherein said pinion gear includes a radial groove and said arm includes a recess for receiving said groove, wherein said arm is movable axially with respect to said shaft for axially moving said pinion gear on said shaft.

22. The fishing reel of claim 21, further comprising at least one spring for biasing said arm and pinion gear toward said spool.

23. The fishing reel of claim 21, further comprising a movable cam member engaging said arm for camming said arm away from said spool and disengaging said pinion gear from said spool.

24. The fishing reel of claim 23, wherein said cam member is rotatable about a common axis with said spool.

25. The fishing reel of claim 23, wherein said cam member includes a ring mounted for limited rotation about a common axis with said shaft, said ring having at least one inclined cam surface for camming said arm away from said spool.

26. The fishing reel of claim 15, wherein said shaft and spool include a bearing having opposing inner and outer bearing races and have at least one ball bearing received in said races, said reel further comprising a casting brake assembly for applying an axial pressure to said shaft with respect to said bearing and said spool for limiting free spinning of said spool on said shaft.

27. The fishing reel of claim 15, wherein said drag control assembly comprises opposing brake elements for applying a braking pressure against said carrier and an adjusting device for selectively adjusting the pressure of said brake elements against said carrier.

28. The fishing reel of claim 27, wherein said adjusting device is a knob threaded to said housing.

29. A fishing reel comprising
a frame;
a spool shaft coupled to said frame and being non-rotatable with respect to said frame;
a spool rotatably mounted on said spool shaft for receiving a fishing line;
a drive member coupled to said frame and being rotatable about a common axis with said spool shaft,
a ring gear coupled to and driven by said drive member about a common axis with said spool shaft, said ring gear having internal teeth;
a planetary gear carrier and a plurality of planetary gears rotatably mounted on said carrier and engaging said internal teeth of said ring gear;
a drag control assembly for resisting rotation of said carrier with respect to said frame;
a pinion gear having external teeth engaging said planetary gears and being disengagably coupled to said spool on said non-rotatable shaft for driving said spool; and
a level wind screw assembly operatively coupled to said pinion gear and being driven by said pinion gear.

30. The fishing reel of claim 29, further comprising an idle gear rotatably mounted to said frame and operatively coupled to said pinion gear, wherein said level wind screw includes a drive gear coupled to said idle gear.

31. A fishing reel comprising
a frame;
a spool shaft coupled to said frame and being non-rotatable with respect to said frame;
a spool rotatably mounted on said spool shaft for receiving a fishing line;
a drive member coupled to said frame and being rotatable about a common axis with said spool shaft,
a ring gear coupled to and driven by said drive member about a common axis with said spool shaft, said ring gear having internal teeth;
a planetary gear carrier and a plurality of planetary gears rotatably mounted on said carrier and engaging said internal teeth of said ring gear, said carrier having a center axis coaxially aligned with said spool shaft;
a drag control assembly for resisting rotation of said carrier with respect to said frame, said drag control assembly including a plurality of drag washers encircling said spool shaft and frictionally engaging said carrier; and
a pinion gear having external teeth engaging said planetary gears and being rotatably mounted on said spool shaft and being coupled with said spool.

32. The fishing reel of claim 31, further comprising an adjustment device coupled to said frame and being rotatable about a common axis with said spool shaft for applying a braking pressure to said drag washers.

33. The fishing reel of claim 32, further comprising an annular pressure plate coupled to said adjustment device for applying said braking pressure to said drag washers.

* * * * *